June 10, 1930. A. O. ABBOTT, JR 1,762,146
APPARATUS AND METHOD FOR MAKING TIRE CASINGS
Filed Feb. 23, 1929
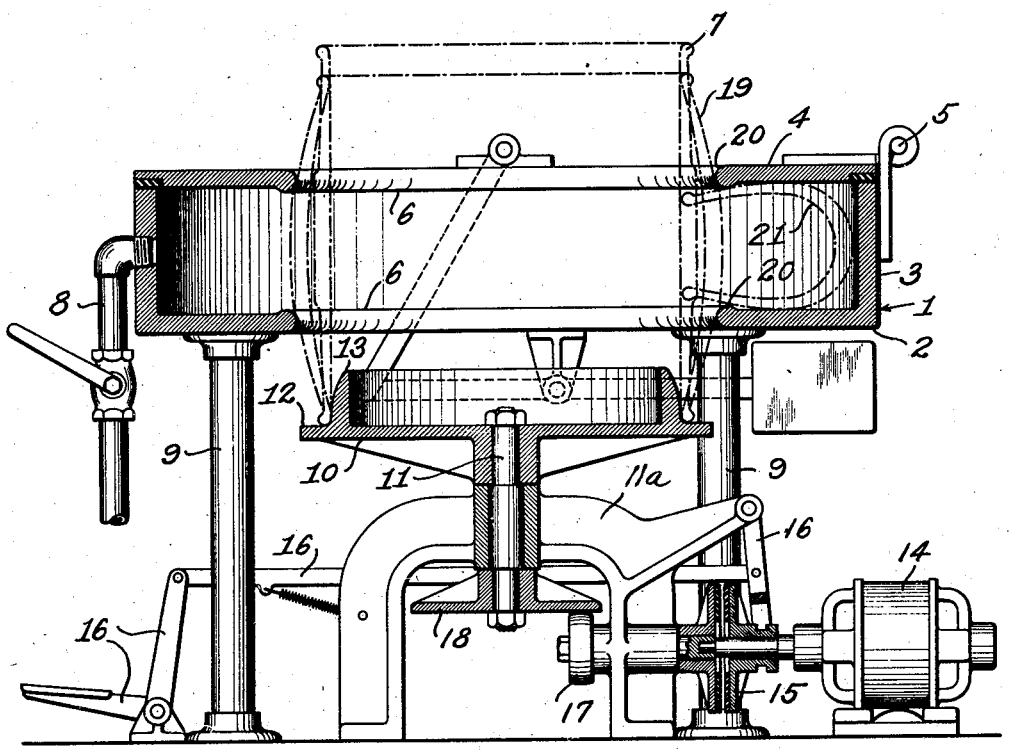
INVENTOR.
Adrian O. Abbott, Jr.
BY
ATTORNEY Patented June 10, 1930

1,762,146

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS AND METHOD FOR MAKING TIRE CASINGS

Application filed February 23, 1929. Serial No. 341,969.

This invention relates to devices for shaping pulley bands into tire casings.

In the art of making tire casings, it is common to build the casing about a flat drum so as to form a ring shaped band known as the pulley band. This pulley band is then shaped into a tire casing by a suitable device such as is known in the tire art as a vacuum box. The vacuum box usually consists of a circularly shaped box, the top and bottom parts of which are provided with circularly shaped apertures to receive a pulley band therein. In cross section the sides of the box have a U-shape of such proportions as to accommodate a tire casing of proper shape. In order to effect the deformation of the pulley band into the tire casing suction or reduced pressure is applied within the vacuum box which acts to expand the pulley band into the shape of the tire casing. Such a vacuum box has apertures in its top and bottom plates which are necessarily larger than the outside chamber of the pulley band in order to readily permit of the insertion of the pulley band within the vacuum box. In order to effect an air tight seal between the vacuum box and the pulley band so that a reduced pressure may be formed within the vacuum box, various devices have been resorted to. Usually these preliminary sealing devices have taken the form of elastic members which are arranged to be expanded and contracted so as to admit the pulley band within the vacuum box and also to effect the seal between the vacuum box and the pulley band.

It is the object of this invention to provide a new method and apparatus for effecting the preliminary seal between a vacuum box and a pulley band. It is also the object of this invention to provide a method and apparatus for effecting a preliminary seal between a vacuum box provided only with apertures in the top and bottom plates which are larger in diameter than the outside diameter of the pulley band. It is also the object of this invention to provide a method and apparatus for effecting the seal between the pulley band and the vacuum box by the action of centrifugal force.

Other objects and advantages of the present invention will appear in the following detailed description taken in connection with the accompanying drawings, in which:

The figure is a diametrical cross sectional view of the vacuum box and associated mechanism of this invention.

As shown in the drawing the vacuum box 1 consists of a bottom wall 2 having the annular side wall 3 integral therewith. The top wall 4 is hingedly mounted upon the side wall 3 as shown at 5 and is adapted to close the vacuum box. Circular apertures 6 are provided in the top and bottom walls and are of such a diameter as to readily receive the pulley band 7 therein. Pipe connection 8 leads from the vacuum box to a suitable air exhausting system. Suitable supports such as posts 9 are provided for supporting the vacuum box.

Beneath the vacuum box and centrally located with respect thereto is positioned the platform 10 which is rigidly mounted on shaft 11 carried in suitable bearings in the frame 11ª. The platform 10 is provided with the ledge 12 upon which the lower edge of the pulley band 7 rests when it is first inserted in the vacuum box. The upstanding annular flange 13 is provided on the platform 10 to centrally position the pulley band with respect to the vacuum box. The upstanding flange 13 is tapered inwardly as shown clearly in the figure for a purpose which will later become evident. The platform 10 is driven in rotation by a source of power such as the motor 14 which acts through the clutch 15, controlled by a suitable lever and treadle system 16 to drive the friction wheel 17, which friction wheel 17 drives the disk 18 rigidly mounted upon the shaft 11 through frictional contact.

In the operation of the machine hereinbefore described, a pulley band 7 is inserted within the vacuum box and placed so as to rest upon the platform 10. Suction applied through the pipe 8 tends to reduce the air pressure within the vacuum box by the continual flow of air through the pipe system 8 from the vacuum box. The platform 10 is set into rotation by actuation of the clutch 15.

Rotation of the platform 10 carries the pulley band 7 in rotation therewith and due to the action of centrifugal force derived from the rotary motion of the pulley band, the pulley band is distended from the shape shown in dotted lines at 7 to the shape shown in dotted lines at 19, which distension of the pulley band causes it to come in contact with the edges 20 which define the apertures 6 in the top and bottom sides of the vacuum box and thereby effect an air tight seal between the pulley band and the vacuum box. Once this air tight seal is formed the continuous withdrawal of air from the vacuum box through the pipe 8 causes the seal to be made permanent and the pulley band to be further expanded and finally brought into the shape of a tire casing as shown in dotted lines at 21. As the shaping of the pulley band progresses, the inward taper of the flange 13 permits the lower edge of the band to slip off the flange.

While one machine has been described hereinabove for effecting the seal between a pulley band and a vacuum box by the action of centrifugal force, it is obvious that other machines may be made to carry out this same method. Therefore it is intended that the invention herein disclosed shall comprehend in addition to the apparatus, the method of effecting a seal between the pulley band and the vacuum box which consists in rotating the pulley band with sufficient rapidity to cause the same to expand under the action of centrifugal force and thereby to come into contact with the vacuum box and form a seal therewith. This invention also comprehends the method of shaping a tire casing from a pulley band which involves expanding the pulley band into sealing relation with a vacuum box by the action of centrifugal force due to rotation and to complete the seal and the shaping of the pulley band by the differential of pressure between the interior and exterior of the vacuum box which is applied simultaneously with the rotation of the pulley band.

While a specific form of apparatus embodying this invention and for carrying out the herein described method has been disclosed, it is not intended to so limit the invention inasmuch as the details of construction of the apparatus and the details of the steps in the method may be varied within wide limits as will readily be understood by one skilled in the art, and all such variations of a specific form of the invention herein disclosed are contemplated and intended to be included as part of this invention, the scope of which is defined by the following claims.

Having thus described my invention what I claim and desire to protect by Letters Patent is:

1. In a machine for shaping pulley bands into tire casings, in combination, a device for expanding the pulley band by differential pressure, and means for rotating the pulley band so as to centrifugally distend the pulley band into contact with said device and to effect a seal therebetween.

2. In a machine for shaping pulley bands into tire casings, in combination, a vacuum box adapted to form tire casings, the top and the bottom of said vacuum box having apertures bounded by rigid edges adapted to receive the pulley band, and means for rotating the pulley band so as to centrifugally extend the pulley band into contact with said edges to effect a seal therebetween.

3. In a machine for shaping pulley bands into tire casings, in combination, a vacuum box adapted to form tire casings, the top and bottom of said vacuum box having apertures bounded by rigid edges adapted to receive the pulley band, a rotatable platform arranged to support the pulley band within the vacuum box, and means for rotating the platform and pulley band so as to centrifugally expand the pulley band into contact with said edges and thereby to form a seal between the pulley band and the vacuum box.

4. That method of expanding pulley bands into tire casings which involves the steps of spinning a pulley band so as to partially expand it by centrifugal force, and applying suction to the spinning band so as to draw the partially shaped band into the form of a tire casing.

5. In the art of building tire casings, the steps of assembling the constituent elements of a tire casing into the form of a pulley band, shaping the pulley band into tire casing form by spinning the pulley band so as to partially expand it and by applying suction to the spinning band to completely expand it.

Signed at Detroit, county of Wayne, State of Michigan, this 18th day of February, 1929.

ADRIAN O. ABBOTT, Jr.